(12) United States Patent
Shinji et al.

(10) Patent No.: US 6,287,618 B1
(45) Date of Patent: Sep. 11, 2001

(54) METHOD OF PRODUCTION OF CITRUS CONCENTRATED AROMA AND METHOD OF PREPARATION OF FLAVOROUS COMPOSITION OR DRINK USING THE RESULTING FLAVOROUS COMPONENT

(75) Inventors: Kawamata Shinji; Suzuki Norio; Nozaki Osamu; Nagano Katsumi; Ishii Hiroshi, all of Hiratsuka (JP)

(73) Assignee: Takasago International Corporation, Tokyo (JP)

( * ) Notice: Subject to any disclaimer, the term of this patent is extended or adjusted under 35 U.S.C. 154(b) by 0 days.

(21) Appl. No.: 09/717,401

(22) Filed: Nov. 22, 2000

(30) Foreign Application Priority Data

Nov. 22, 1999  (JP) ................................. 11-331820

(51) Int. Cl.$^7$ ....................................... A23F 3/00
(52) U.S. Cl. ...................... 426/387; 426/386; 426/534; 426/650; 426/616
(58) Field of Search .................... 426/386, 387, 426/534, 538, 650, 616

(56) References Cited

U.S. PATENT DOCUMENTS 4,995,945 * 2/1991 Craig ..................................... 426/492

OTHER PUBLICATIONS

Sykes et al., AN 93(01):E0015 FSTA, abstracting Food Australia, 1992, 44(10), 462–464.*
Schofield, T., AN 472891 FROSTI, abstracting International Food Marketing and Technology, 1998, Jun., 12(3), 32–35.*

* cited by examiner

Primary Examiner—Leslie Wong
(74) Attorney, Agent, or Firm—Morgan, Lewis & Bockius LLP

(57) ABSTRACT

The invention provides a method of the preparation of a citrus concentrated aroma component which has flavorous strength sufficient to be used as a flavor and fragrance's raw material, imparts a fresh feeling, fruit juice feeling and natural feeling to drinks or flavorous compositions and also has an effect of masking the smell of citrus juice caused by heating. The method of producing a citrus concentrated aroma includes concentrating fruit juice continuously under reduced pressure such that the concentration of flavorous components is in excess of 100 to 150 times that of the fruit juice until the alcohol content is increased up to 1 to 7% by weight, adding a filtering aid to the concentrated citrus recovery solution to carry out filtration and floating and separating the essence oil. The remaining concentrated citrus recovery solution, from which the essence oil is removed, is introduced into a spinning cone column (SCC) to treat the recovery solution in the condition that the temperature in the column is 40 to 80° C., the strip ratio is 1 to 10% and the operating pressure is 0.2 to 40 kPa.

6 Claims, 2 Drawing Sheets

METHOD OF PRODUCTION OF CITRUS CONCENTRATED AROMA AND METHOD OF PREPARATION OF FLAVOROUS COMPOSITION OR DRINK USING THE RESULTING FLAVOROUS COMPONENT

This invention claims priority to Japanese patent application number 11-331820, filed on Nov. 22, 1999, herein incorporated by reference in its entirety.

FIELD OF THE INVENTION

The present invention relates to a method of producing a citrus-concentrated aroma obtained by carrying out specific treatment using citrus juice as starting material and a method of preparing a flavor and fragrance composition, a drink and the like by using the citrus concentrated aroma obtained in the above method.

BACKGROUND

The usual citrus concentrated aromas which are commercially available are fruit juice products which have an alcohol content of 8 to 15% by weight and are concentrated more than 500 times by using essence recovery units attached to a T.A.S.T.E. (Thermally Accelerated Short Time Evaporator). Also, highly concentrated products of the concentrated aroma are commercially available. In the production of these concentrated aromas, the loss of low boiling point fractions is prevented, for example, by improving the refining ability of a distilling column and by flowing liquid ammonia through a condenser. However, not only can these fractions not be collected, but also it takes a long time for the concentrating operation to increase the degree of concentration (see J. Agric. Food Chem. 1990, 38, 2181).

With regard to the flavor of fruit juice, it is known that the flavorous component is obtained by extraction using an organic solvent which can be separated from water. However, this method has not been used very often on account of its high cost. While, for the purpose of collecting low boiling point fractions efficiently and preventing a change of flavor caused by heating, the separation of flavorous substances by using a spinning cone column (hereinafter simply referred to as "SCC") and mass-transfer equipment. Such methods are explained in "1st Conference of Food Engineering, 1991, AlchE, Chicago, Ill.," herein incorporated by reference. Also, it is disclosed in the specification of WO 90/02493 that vegetables and fruits such as tomatoes, apples and pears are processed using the SCC to obtain a high viscosity component having a low flavor.

There are detailed descriptions concerning the design of a column of the SCC in "I.

Chem. E. Symp. Series, A128, 167–179, 1992. The SCC is also used in a process of the recovery of volatile components such as flavors wherein a volatile component (ethanol) is recovered at lower temperatures from a culture solution of fermented yeast (see Process Biochemistry, Vol. 31, No. 7, pp. 651–658, 1995).

A method for removing flavorous components from fruit juice is disclosed in the publication of JP-B-7-22646. In this method using equipment which removes aromas from fruit juice by utilizing the SCC used also in the present invention, the operation of removing these aromas is carried out in the column and the fruit juice whose aroma is removed is refined and subjected to filtration and thereafter the fruit juice is concentrated without the deterioration of flavorous components. The fruit juice is directly introduced into the SCC and treated in the following condition in the case of oranges: flow rate: 5,000 L/hr, operating temperature: 65° C., operating pressure: 60 kPa, flow rate of recovery flavor: 75 L/hr and ratio to total fruit juice: 1:50.

There is a report that in the recovery of the flavorous components of apples and red berry fruits, the level of the content of free and combined sulfurous acid is lowered to 5 ppm or less (Food and Container, Vol. 39, No. 7, pp. 406–408, 1988). In the recovery of flavorous components in Flavourtech (see the specification of U.S. Pat. No. 4,996,945), high recovery rates are obtained in the processing of beers, apples, oranges, grapes, apricots or strawberries.

SUMMARY

One aspect of this invention relates to a method of producing a citrus concentrated aroma, the method comprising concentrating fruit juice continuously under reduced pressure (T.A.S.T.E.) such that the concentration of flavorous components is in excess of 100 to 150 times that of the fruit juice until the alcohol content is increased Up to 1 to 7% by weight, adding a filtering aid to the concentrated citrus recovery solution to carry out filtration. After filtration, the essence oil is floated and separated. The remaining concentrated citrus recovery solution, from which the essence oil is removed, is introduced into a spinning cone column (SCC) to treat the recovery solution in the condition that the temperature in the column is 40 to 80° C., the strip ratio is 1 to 10% and the operating pressure is 0.2 to 40 kPa. The strip ratio is preferably 2 to 8%.

A second aspect of this invention relates to a method of preparing a flavorous composition, the method comprising adding the citrus concentrated aroma obtained by the first method in an amount of 5 to 100% by weight to flavors and fragrances.

A third aspect of this invention relates to a method of preparing a drink or the like, the method comprising adding the citrus concentrated aroma or the flavorous composition obtained by the first or second method in an amount of 0.01 to 5% by weight to one type selected from the group consisting of drinks, frozen sweets, deserts and baked sweets.

DETAILED DESCRIPTION

Figure 1:
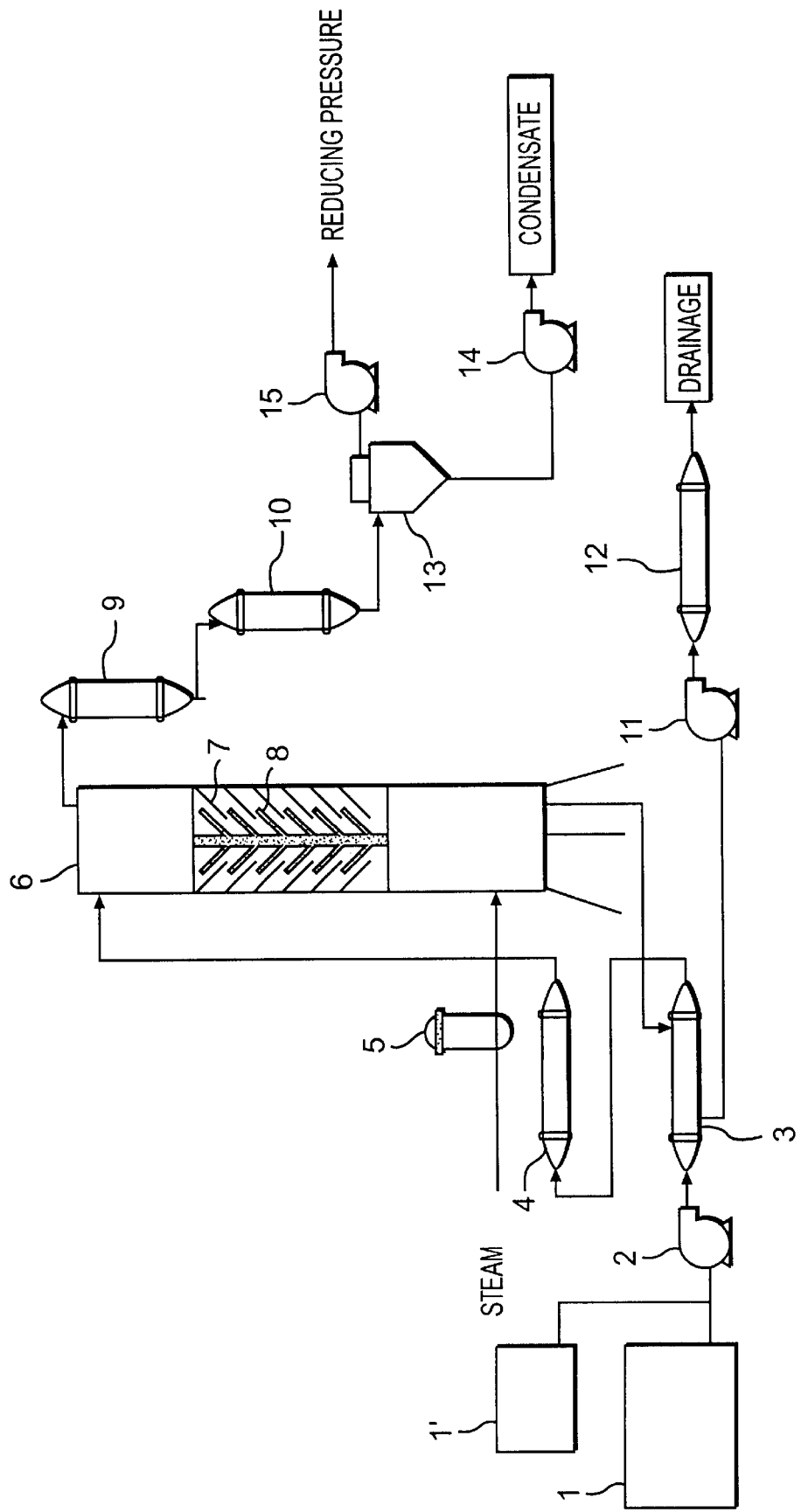
FIG. 1 is a schematic view of a spinning cone column (SCC)

If extraction is performed using an organic solvent like in the conventional methods, the organic solvent extracts unnecessary components and these methods are very costly means and pose the problem that water-soluble low molecular components can be extracted only insufficiently. The important point of the concentration of citrus aromas is how to collect low boiling point fractions efficiently and how to prevent the flavor from being changed caused by heating.

For these purposes, first the studies were made on the concentration using a reverse osmosis membrane. However, the concentration is limited to 7 times that of starting material and a further concentrating operation results in the loss of low boiling point fractions. Although studies on pervaporation was made as a measures taking the place of the concentration using a reverse osmosis membrane, it was hard to wash the membrane: (α-terpineol which was regarded as the cause of oxidative odor of citrus oil adsorbed to the membrane and could be removed only incompletely. For the purpose of solving these problems, studies concerning the use of SCC was made. However, when fruit juice was treated directly by the SCC, excess essence oil recovered in a mixed state is dissolved in the concentrated aroma and hence flavorous components which are peculiar to citrus and consisting of the aforementioned water-soluble low molecules in accordance with the object of the present invention could not be obtained.

The present invention is to provide a method of concentrating a citrus aroma to obtain these flavorous components peculiar to citrus and also to provide a method of preparing a flavorous composition which can maintain flavor peculiar to citrus even if it is used at a dilution of 1:10,000, the method comprising adding the resulting flavorous components to drinks or flavorous compositions so that the prepared product has a higher degree of perfection.

The inventors of the present invention have made earnest studies to solve the aforementioned problem and as a result, obtained not only recovery flavor but also a flavorous component which solves the aforementioned problem by performing specific pretreatment of fruit juice and exploiting the aforementioned SCC in specific conditions to treat the pretreated fruit juice. Specifically, the present invention is concerned with a method of the production of a citrus concentrated aroma. In the method, the aqueous solution containing flavorous components recovered in the process of concentrating fruit juice is concentrated more than specific times, namely, until the concentrated product has a specific alcohol content % by weight. The recovered aroma solution from T.A.S.T.E. is subjected to filtration. An emulsion is decomposed thereby. The essence oil is floated and separated and the essence oil is removed from the solution and the resulting aroma-containing water layer is introduced into a spinning cone column (SCC) and treated in the condition that the temperature and the strip ratio in the column are respectively fixed to a specific value and the degree of vacuum is also fixed to a specific value. The present invention is also concerned with a method of preparing a flavor and fragrance composition, a drink or the like by using the resulting citrus concentrated aroma.

A citrus aroma recovery solution used in the present invention is a flavorous fraction peculiar to citrus which is obtained in the course of concentrating a citrus juice such as oranges, grapefruits, and lemons. The degree of concentration of the solution must be slightly varied because the content of essential oil components differs depending upon the types of raw fruit juice, varieties, producing districts and harvest times. It is important on the whole that essence oil derived from fruit juice is sufficiently separated from the concentrated flavorous components and the remaining concentrated citrus recovery solution, in which citrus aroma is contained, is obtained at an economical cost. It is necessary to concentrate raw fruit juice such that the concentration of flavorous components is in excess of about 100 to 150 times that of the raw fruits juice until the content of alcohol is increased to 1 to 7% by weight.

The continuous vacuum equipment used for the concentration of fruit juice needs not be specific but be sufficed by conventionally used continuous vacuum equipment. For example, in a T.A.S.T.E., the concentration is attained in the condition that the temperature of a second stage tube nest of the column is 96° C. or less, the operating pressure is 38.5 kPa and the heating, time is 2 minutes.

To separate the essence oil from the citrus aroma recovery solution, preferably the separating operation is carried out by dividing it into two steps as follows.

Firstly, in the first separating step, the citrus aroma recovery solution having flavorous components concentrated in excess of 100 to 150 times until the alcohol content is increased to 1 to 7% by weight is placed, for example, in a cold wall tank controlled at 4° C. to separate essence oil which begins floating by this treatment. Next, in the second step, the citrus recovery solution (water layer) obtained after the first separating step is allowed to stand in a cold dark place for about 2 to 4 days to promote the separation ability of the essence oil left unremoved in the water layer (a part of the essence oil which is in an emulsion state begins floating by this stationary operation). Further, in order to remove a large part of the essence oil which is an emulsion state, diatomaceous earth such as Celite 535 and Celite 545 (both are the trademarks of JOHNSMANVILLE) as the filtering aid was added to the citrus recovery solution in an amount of 0.1 to 1% by weight based on the solution and the citrus recovery solution is fed to a multiplate filter with stirring to decompose the emulsion. Thus the essence oil which begins floating is separated. By such a two-step treatment almost all essence oil can be removed from the citrus recovery solution.

The refined citrus recovery solution (citrus aroma) from which essence oil is removed by such a two-step separation, specifically, in the condition that the concentration of the essence oil in the aroma is reduced to less than a fixed minute level or less, and introduced into the SCC. The condenser of SCC must be sufficiently cooled to prevent losing acetaldehyde, which is the feature of the citrus recovery aroma, from being lost on account of the volatilization thereof from the concentrated solution.

The amount of the refined citrus recovery solution to be fed is about 4,500 to 6,000 L/h. The temperature in the column is 40 to 80° C., preferably 40 to 60° C. and particularly preferably around 50° C. The strip ratio is 1 to 10%, preferably 2 to 8% and particularly preferably around 4%. The operating pressure making the aroma more fruit juice-like is 40 to 0.2 kPa and preferably around 5 kPa. The flow rate of a cooling medium is about 4,000 to 6,000 kg/hr and preferably around 5,000 kg/hr to prevent acetaldehyde from being entrained in vacuum exhaust and to keep the temperature of the product at 10° C. or less.

The aforementioned degree of vacuum may be changed corresponding to the conditions such as the types of raw material, the amount of alcohol and the strip ratio. Also, the process time, namely the passing time required for the concentrating process from a heater to the lower portion of the column body is about 1 to 4 minutes and preferably about 2 minutes. The passing time is determined in relation to the amount to be fed, to the strip ratio and to what amount and what concentration are required after the operation of the column is made to be in stationary state.

More preferable citrus concentrated aromas to be obtained include those which are free from the smell of something heated which is called the potato smell and have a natural feeling, fruit juice-like feeling and fresh feeling caused mainly by acetaldehyde and green note. The content of alcohol in the aroma is 15 to 40% by weight and preferably 20 to 30% by weight. The specific gravity of the aroma is 0.9924 to 0.9641 and the refractive index of the aroma is 1.3344 to 1.3356.

The citrus concentrated aroma obtained in the above production method can be compounded in a flavor and fragrance. The amount of the citrus concentrated aroma to be compounded in the flavors and fragrances is 5 to 100% by weight based on the flavors and fragrances generally within a range in which its characteristic flavor or fragrance is not damaged. When the amount to be added is excessive, no further effect is produced whereas when the amount to be added is too small, no effect is obtained by addition. The flavor and fragrance so-called here means mixing flavors and fragrances.

The resulting citrus concentrated aroma or the flavor and fragrance composition in which the aroma is compounded may be compounded in drinks, liquors, frozen sweets, deserts, baked sweets and the like. The amount of the citrus concentrated aroma or the flavor and fragrance composition obtained by the above preparation method is added to each of drinks, liquors, frozen sweets, deserts, baked sweets and the like in an amount of 0.01 to 5% by weight based on each of these drinks or the like. If the amount is out of the above range, no natural fragrance can be imparted, which is the same as above. Examples of drinks and the like to which an effect is given by applying the citrus concentrated aroma include citrus-containing drinks such as tea drinks (non-sugar or containing sugar), lactic drinks, fruit juice drinks, nutrient drinks, carbonated drinks (non-sugar or containing sugar), sports drinks (non-sugar or containing sugar), cola drinks and near water (non-sugar or containing sugar) and alcoholic drinks such as cocktails, frozen sweets and deserts such as puddings, jellies, yogurts, sherbets, ice candies, gums, candies and tablets and baked sweets such as cookies. Also, the citrus concentrated aroma obtained by the method of the present invention and the flavor and fragrance composition in which the citrus concentrated aroma is compounded may be used for flavor and fragrance products.

The present invention ensures that a citrus concentrated aroma which may be applied to a wide range of drinks and foods and has high quality and a characteristic flavor and fragrance associated with fresh fruits can be produced in a large amount. The flavorous component obtained in the present invention makes it possible to prepare a highly effective composition which can impart characteristic fresh aroma different from the conventional citrus flavor and fragrance.

The present invention will be hereinafter explained in more detail by way of examples, which are not intended to be limiting of the present invention.

Instruments

1. A spinning cone column (SCC), measuring instruments and measurement methods used in examples are as follows:
   a) SCC: M10000, manufactured by Flavourtech Dty. Ltd., 1000 mm (the inside diameter of the column)×4000 mm (the height of the column).
   b) Measurement of refractive index
      Precision Abbe's refractometer NAR-3T (ATAGO)
   c) Measurement of the content of ethanol
      Gas chromatography
      Hewlett Packard HP 5890
      Column TC-WAX (GL Science) (30 m×0.53 mmID, 1.0 μmdf)
      Detector: TCD, temperature: from 45° C. to 210° C. (kept for 10 minutes), the rate of a rise in temperature: 5° C./minute
      Injection amount: 2.0 μl, sprit ratio: 25:1, injection temperature: 230° C., detection temperature: 250° C.
   d) Measurement of the content of flavorous components
      Gas chromatography
      Hewlett Packard HP 5890
      Column: BC-WAX (GL Science) (30 m×0.25 mmID, 1.0 μmdf)
      Detector: FID, temperature: from 40° C. (kept for 4 minutes)→(1° C./min)→50° C.→(3° C./min)→80° C.→(15° C./min)→230° C. (kept for 10 minutes)
      Injection amount: 4.0 μl, sprit ratio: 100:1, injection temperature: 240° C., detection temperature: 240° C., quantitative method: internal standard quantitative method using 2-butanol 2. A method of operating a spinning cone column (SCC: M10000), a flow diagram as to the start of the operation of the SCC and each regulation of the column temperature and strip ratio will be briefly explained with reference to FIG. 1 and FIG. 2.

The essence oil is separated from the feedstock. Then, the refined citrus recovery flavorous component in an amount corresponding to a desired amount of the product is placed in an SCC feed tank (1) with a stirrer and sufficiently stirred so that the feedstock is mixed uniformly. The quality of the feed stock is checked by sampling and the viscosity of the feedstock is measured.

Initially, city water is allowed to flow from a city water tank (1') to a SCC column (6) to set flavor recovery conditions. The amount of feed, the temperature of the outlet of a heat exchanger and the top temperature and bottom temperature of the column are set by an operation on an operating board. Next, the opening of a vacuum valve is adjusted to determine the temperatures (the top temperature and bottom temperature of the column) of the entire SCC column (6). The strip ratio is determined by regulating the amount of steam to be injected from a steam filter (5) into the column (6). The amount of the city water discharged from a second condenser (10) is measured to confirm whether or not a desired strip ratio in accordance with the amount of feed is obtained. When the amount of feed in accordance with the set condition is obtained, the city water was switched to the feedstock.

Next, the feedstock is allowed to flow from the SCC feed tank (1) of the SCC to the SCC column (6) to set flavor recovery conditions in the same manner as in the case of city water. After the drainage of the feedstock flows out from the discharge port of the SCC column (6) and a solution containing a flavorous component starts flowing out through a second condenser (10) and a condensate-discharge pump (14), the flow amount per hour is confirmed again and the flavor and fragrance of the solution is confirmed by comparing it with that of a standard sample (the strip ratio is exact). Then the recovery of flavorous components is started. At this time, the flavor of the drainage is confirmed. The amount of feed, the temperature of the outlet of the heat exchanger, the top temperature and bottom temperature of the column, the degree of vacuum and the strip ratio are checked and recorded at intervals of about 30 minutes until the operation is finished.

The SCC is washed immediately after the operation is finished. It is sufficiently finished until there is no residual odor remaining in a system, particularly, from a second condenser to a second condensate-discharge pump.

EXAMPLE 1

Preparation of an Orange Aroma Recovery Solution with an Aroma Concentration in Excess of 100 to 150 Times that of the Feedstock Orange juice (from Florida (manufactured by Sun Pure)) was allowed to flow at a rate of 27,272 kg/hr in a T.A.S.T.E. and concentrated in the condition that the temperature of the second tube nest of the concentrating column was 95° C. and the operating pressure was 38.5 kPa. An orange aroma recovery solution having flavorous components in a concentration 100 to 150 times that of the feedstock flowed out at a rate of 360 kg/hr from the essence recovery units attached to a T.A.S.T.E.

Property of the aroma recovery solution: alcohol content 3.1% by weight; specific gravity: 0.9947; refractive index: 1.3345.

EXAMPLE 2

Preparation of a Grapefruit Aroma Recovery Solution Concentrated in Aroma Content in Excess of 100 to 150 Times that of the Feedstock A grapefruit aroma recovery solution concentrated in aroma content in excess of 100 to 150 times that of the feedstock was allowed to flow out at a rate of 98 kg/hr in the same manner as in Example 1 except that grapefruit juice was used in an amount of 27,272 kg/hr in place of the orange juice used in Example 1.

Property of the grapefruits' aroma recovery solution: alcohol content 2.5% by weight; specific gravity 0.9954; refractive index 1.3347.

EXAMPLE 3

Separation of Essence Oil from the Aroma Recovery Solution

The orange aroma recovery solution obtained in Example 1 was placed in a 20,000 L storage tank (4° C.) and circulated under cooling over two days and nights to float and separate excess essence oil firstly. Then, the next secondary separation was carried out in succession to this primary separation. First, prior to the operation of the secondary separation, the aroma recovery solution obtained after the primary separation of the essence oil was carried out was placed as a pre-operation in an amount of only 700 kg in a pre-coat-tank. Thereafter, 10 kg of Celite 535 (trademark, manufactured by JOHNSMANVILLE) was added in the pre-coat-tank and filtering aid was added to the cloudy mixture with stirring. As a consequence, Celite 535 was accumulated gradually on the filter and also the refined aroma recovery solution was discharged as the filtrate. Then, an operation of circulating the filtrate while it is continuously fed-back to the above pre-coat-tank was carried out for about 15 minutes. The mixture in the separate tank after the pre-coating was cloudy at first but was gradually changed to a nearly transparent state. After such a pre-operation was finished, 5 kg of Celite was added in the pre-coat-tank and the orange aroma recovery solution was continuously filtered by the filter which had been already pre-coated with Celite 535 while it was continuously fed to the separate tank from the 20,000 L storage tank. The filtrate (rectified aroma recovery solution) which was filtered and discharged was continuously introduced into the SCC feed tank this time unlike the case of the aforementioned pre-operation.

The properties of the aroma recovery solution after the filtration: aldehyde value 6762. For an illustration of the HBS method, see *J. Agr. Food Chem.*, vol. 18, no.5, pp. 908–910.

It is to be noted that the aldehyde value before the filtration was 8217 (HBS method).

Similarly, the grapefruit aroma recovery solution was processed in the same manner as in the case of the above orange aroma recovery solution to obtain a rectified aroma recovery solution.

The properties of the aroma recovery solution obtained in Example 3 are shown in Table 1 and the qualities of the aroma recovery solutions obtained in Examples 1 and 2 are also shown in Table 1 for comparison.

Example 4

Treatment by SCC

Figure 2:
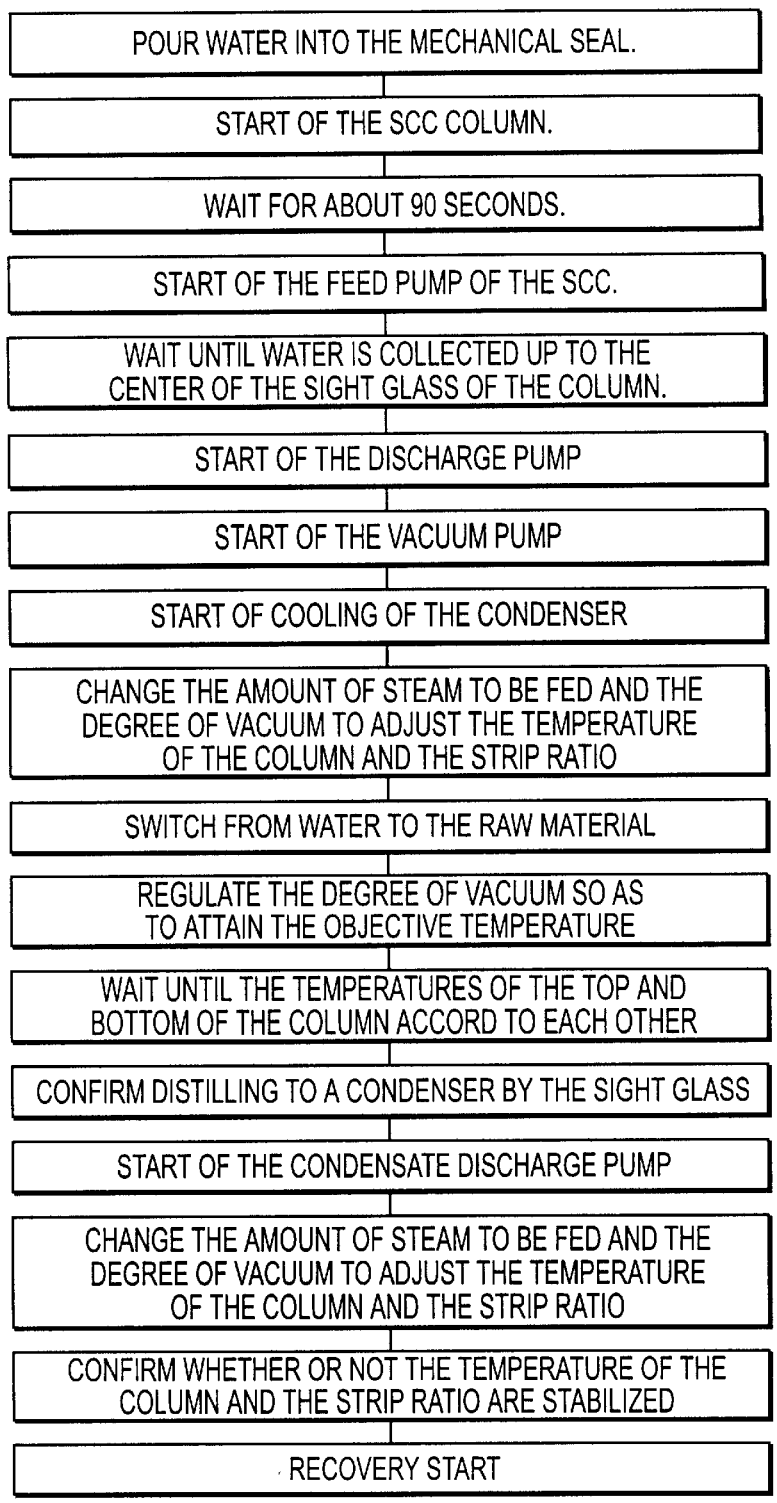
FIG. 2 is an explanatory view showing a flow diagram of the start of an operation until the start of recovery by a spinning cone column (SCC).

According to the aforementioned flow in FIG. 2, the orange aroma recovery solution and the grapefruit aroma recovery solution after the filtration which were obtained in the aforementioned Example 3 were respectively filled in the SCC feed tank and used. Each solution was introduced into the SCC column at a rate of 2,800 L/hr to carry out SCC treatment in the condition that the temperature of the top of the column was 55° C., the temperature of the bottom of the column was 57° C. and the strip ratio was 4%. 9,500 L of each feedstock was treated in an operation for about 3 hours to obtain 380 L of a citrus concentrated aroma. The properties of each component are shown in Table 1.

In the table, the specific gravity is a value of $d_{20}^{20}$ and the refractive index is a value of $n_p^{20}$.

TABLE 1

| | Component Properties | | | | |
|---|---|---|---|---|---|
| | Aldehyde value | Alcohol content | Specific gravity | Refractive index | Tone and appearance |
| Example 1 Orange | 8217 | 3.1 | 0.9947 | 1.3345 | Pale cloudy |
| Example 2 Grapefruit | 8653 | 2.5 | 0.9954 | 1.3347 | Pale cloudy |
| Example 3 orange | 6762 | 3.1 | 0.9947 | 1.3345 | Non-colored and transparent |
| Grapefruit | 6035 | 2.5 | 0.9954 | 1.3348 | Non-colored and transparent |
| Example 4 Orange | 17525 | 38.7 | 0.9357 | 1.3384 | Non-colored and transparent |
| Grapefruit | 12216 | 24.1 | 0.9644 | 1.3504 | Non-colored and transparent |

TEST EXAMPLE 1

A comparison of the content of each flavorous component was made between the citrus concentrated aroma and the aroma recovery solution after the filtration, the content being measured using the internal standard and the results are shown in the following table.

The unit is represented by % by weight for ethanol, water and methanol, and by mg/Kg for the components succeeding and including acetaldehyde. "-" shows that the component was not detected.

Content of Each Flavorous Component of the Orange Concentrated Aroma

| | Concentrated aroma | Aroma recovery solution after the filtration |
|---|---|---|
| EtOH (%) | 33.348 | 5.613 |
| Water (%) | 64.779 | 93.983 |
| MeOH (%) | 1.873 | 0.404 |
| Acetaldehyde | 8069.035 | 511.820 |
| Ethyl butyrate | 56.002 | 3.992 |
| Limonene | 78.687 | 0.623 |
| Octanal | 132.236 | — |
| Linalool | 1078.142 | 53.614 |
| -Terpineol | 98.776 | 6.209 |
| Nootkatone | — | — |

Content of Each Flavorous Component of the
Grapefruit Concentrated Aroma

|  | Concentrated aroma | Aroma recovery solution after the filtration |
|---|---|---|
| EtOH (%) | 20.171 | 2.333 |
| Water (%) | 78.263 | 97.425 |
| MeOH (%) | 1.566 | 0.242 |
| Acetaldehyde | 5389.530 | 478.320 |
| Ethyl butyrate | 38.783 | 2.913 |
| Limonene | 12.694 | 2.257 |
| Octanal | 93.016 | — |
| Linalool | 105.873 | — |
| -Terpineol | 84.399 | — |
| Nootkatone | 118.576 | 51.137 |

In the case of the orange, in the above table in which the content of each component is compared between the aroma recovery solution after the filtration which is used as the feedstock and the citrus concentrated aroma as the product when the feedstock is concentrated at a strip ratio of 4%, the concentration ratios of methanol and ethanol which are useless as a flavor and fragrance are 4.6 times and 5.9 times, respectively, whereas the concentration ratios of acetaldehyde and ethyl butylate are 15.8 times and 14.0 times, respectively. It is understood that preferable components are selectively concentrated regardless of the boiling point. With regard to the grapefruit, the same results were obtained.

Sensory Evaluation Test Example 1

The citrus concentrated aroma obtained in Example 4 was added to a 100% reconstituted fruit juice to impart flavor (and fragrance) and the mixed juice was subjected to sterilizing treatment under heat. Then the resulting juice was evaluated for its functional properties in terms of the strength of flavor (flavor strength), flavor tone and effect of masking a potato-like smell by expert panelists (8 males of 5 to 30 years of experience as a flavorist). The results are shown in the following Table 2 together with the properties of commercially available products for comparison.

TABLE 2

Properties of Commercially available products

|  | Flavor strength | Flavor tone | Masking effect |
|---|---|---|---|
| Orange concentrated aroma | 4000 times | Fresh orange juice-like flavor | Confirmed significantly |
| Grapefruit concentrated aroma | 4000 times | Fresh grapefruit juice-like flavor | Confirmed significantly |
| Orange aroma (Company A) | 500 times | Orange juice-like flavor | Poor effect |
| Grapefruit aroma (Company B) | 500 times | Grapefruit juice-like flavor | Poor effect |

Example 5

Using the orange concentrated aroma obtained in Example 4, an orange flavor was prepared according to the following formulation.

| Formulation | Wt % |
|---|---|
| Orange concentrated aroma | 30.0 |
| Conventional orange oil extract | 30.0 |
| Ethyl butylate | 0.01 |
| 95% Ethanol | 39.99 |
| Total | 100.0 |

Other than the above, a grapefruit flavor was likewise prepared.

Example 6

Using the orange concentrated aroma obtained in Example 4, a non-fruit juice drink (no sugar) was prepared according to the following formulation.

| Formulation | Wt % |
|---|---|
| Orange concentrated aroma | 0.04 |
| Stevia (REBAUDIO GRA-90) | 0.012 |
| Aspartame (G-100) | 0.0078 |
| Vitamin C | 0.2 |
| Citric acid | 0.03 |
| Sodium citrate | 0.025 |
| Sodium chloride | 0.005 |
| Ion exchange water | 99.6802 |
| Total | 100.0 |

EXAMPLE 7

Using the orange concentrated aroma obtained in Example 4, a 30% fruit juice drink (including sugar) was prepared according to the following formulation.

| Formulation | Wt % |
|---|---|
| Orange concentrated aroma | 0.05 |
| Orange concentrated fruit juice (concentrated 5.8 times) | 5.18 |
| Fructose/glucose syrup Bx. 75° | 9.47 |
| Vitamin C | 0.03 |
| Citric acid | 0.16 |
| Sodium citrate | 0.03 |
| Ion exchange water | 85.08 |
| Total | 100.0 |

Sensory Evaluation Test Example 2

The flavor prepared in Example 5 and the drinlks prepared in Examples 6 and 7 were evaluated by the same expert panelists as above. As a result, it was confirmed that the orange concentrated aroma had sufficient flavor strength as the flavor raw material and a flavor using the orange concentrated aroma became a useful flavor which was different from conventional types and was associated with fresh fruits due to the functional characteristics of the aroma including factors such as a fresh feeling, fruit juice feeling and natural feeling.

The drink also exhibited the feature of the concentrated aroma and had an excellent fresh feeling, fruit juice feeling and natural feeling. It was also confirmed that the fruit juice drink had an effect of masking a potato-like smell peculiar to fruit juices.

From the above results, it was understood that the composition of the present invention can impart a fresh feeling, fruit juice feeling and natural feeling to mixing products and drinks and is largely different from the conventional flavorous compositions

What is claimed is:

1. A method of producing a concentrated citrus aroma, comprising:

(a) concentrating fruit juice continuously under reduced pressure, such that the concentration of flavorous components in said fruit juice is in excess of about 100 to about 150 times that of said fruit juice, wherein the alcohol content is increased from about 1 to about 7% by weight, to produce a concentrated citrus recovery solution;

(b) adding a filtering aid to said concentrated citrus recovery solution to filter, float and separate the essence oil from said concentrated citrus recovery solution; and (c) introducing said concentrated citrus recovery solution into a spinning cone column wherein the temperature of said column is about 40 to about 80° C., the strip ratio is about 1 to about 10% and the operating pressure is about 0.2 to about 40 kPa.

2. A method of preparing a flavorous composition, comprising:

(a) providing about 5 to about 100% by weight of the concentrated citrus aroma produced by the method of claim 1, and (b) adding to said concentrated citrus aroma a flavor and/or fragrance.

3. A method of preparing a flavorous composition, comprising:

(a) providing about 0.01% to about 5% by weight of the concentrated citrus aroma produced by the method of claim 1, and (b) adding to said concentrated citrus aroma a flavorous composition selected from the group consisting of: drinks, frozen sweets, desserts and baked sweets.

4. The method of producing a concentrated citrus aroma according to claim 1, wherein the strip ratio of said spinning cone column is about 2 to about 8%.

5. A method of preparing a flavorous composition, comprising:

(a) providing about 5 to about 100% by weight of the concentrated citrus aroma produced by the method of claim 4, and (b) adding to said concentrated citrus aroma a flavor and/or fragrance.

6. A method of preparing a flavorous composition, comprising:

(a) providing about 0.01% to about 5% by weight of the concentrated citrus aroma produced by the method of claim 4, and (b) adding to said concentrated citrus aroma a flavorous composition selected from the group consisting of: drinks, frozen sweets, desserts and baked sweets.

* * * * *